US012573874B2

(12) United States Patent
Chen et al.

(10) Patent No.: US 12,573,874 B2
(45) **Date of Patent: *Mar. 10, 2026**

(54) EMERGENCY DRIVER AND INTELLIGENT MODULE FOR THE EMERGENCY DRIVER

(71) Applicant: CURRENT LIGHTING SOLUTIONS, LLC, Beechwood, OH (US)

(72) Inventors: Longyu Chen, ShangHai (CN); Bruce Richard Roberts, Beechwood, OH (US); Taylor Apolonius Barto, Beechwood, OH (US)

(73) Assignee: CURRENT LIGHTING SOLUTIONS, LLC, Beachwood, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/933,854

(22) Filed: Oct. 31, 2024

(65) Prior Publication Data

US 2025/0055310 A1 Feb. 13, 2025

Related U.S. Application Data

(63) Continuation of application No. 17/781,954, filed as application No. PCT/CN2020/073750 on Jan. 22, 2020, now Pat. No. 12,160,135.

(51) Int. Cl.
*H02J 9/06* (2006.01)
*H05B 47/17* (2020.01)
(Continued)

(52) U.S. Cl.
CPC .............. *H02J 9/061* (2013.01); *H05B 47/17* (2020.01); *H05B 47/18* (2020.01); *H05B 47/183* (2024.01); *H05B 47/19* (2020.01); *H05B 47/172* (2024.01)

(58) Field of Classification Search
CPC ......... H02J 9/061; H05B 47/17; H05B 47/18; H05B 47/183; H05B 47/19; H05B 47/172; Y02B 20/40
(Continued)

(56) References Cited

U.S. PATENT DOCUMENTS

| | | |
|---|---|---|
| 7,456,617 B2 | 11/2008 | Chapuis et al. |
| 10,448,484 B1 | 10/2019 | Rodriguez et al. |

(Continued)

FOREIGN PATENT DOCUMENTS

| | | |
|---|---|---|
| CN | 2749201 Y | 12/2005 |
| CN | 101365275 A | 2/2009 |

(Continued)

OTHER PUBLICATIONS

International Search Report and Written Opinion dated Nov. 2, 2020 which was issued in connection with PCT/CN2020/073750.
(Continued)

*Primary Examiner* — Richard Tan
(74) *Attorney, Agent, or Firm* — Buckley, Maschoff & Talwalkar LLC

(57) ABSTRACT

Embodiments are generally directed to an emergency driver (10) and an intelligent module (20) for the emergency driver (10). An embodiment of the emergency driver (10) may include a digital communication interface (12), a DC power supply (14) and a controller (16). The digital communication interface (12) may be configured to receive an input signal (41) via a control bus (18). The DC power supply (14) may be configured to provide a DC output (45) to the control bus (18). The controller (16) may be coupled to the digital communication interface (12) and the DC power supply (14) and may be configured to control the emergency driver (10) to operate in a first operation mode. The input signal (41) received at the digital communication interface (12) may be
(Continued)

a digital input signal when the emergency driver is operating in a first operation mode.

20 Claims, 6 Drawing Sheets

(51) Int. Cl.
　　*H05B 47/18*　　　　(2020.01)
　　*H05B 47/19*　　　　(2020.01)

(58) Field of Classification Search
　　USPC .......................................................... 307/64
　　See application file for complete search history.

(56) References Cited

U.S. PATENT DOCUMENTS

| | | | |
|---|---|---|---|
| 12,160,135 B2 * | 12/2024 | Chen ...................... | H05B 47/17 |
| 2004/0093219 A1 | 5/2004 | Shin et al. | |

| | | |
|---|---|---|
| 2008/0272894 A1 | 11/2008 | Lamon et al. |
| 2015/0008831 A1 | 1/2015 | Carrigan et al. |
| 2016/0126837 A1 | 5/2016 | Tschirhart |
| 2017/0127497 A1 | 5/2017 | Baek et al. |
| 2020/0396809 A1 | 12/2020 | Wei et al. |

FOREIGN PATENT DOCUMENTS

| | | |
|---|---|---|
| CN | 204759127 U | 11/2015 |
| CN | 206117304 U | 4/2017 |
| CN | 110234184 A | 9/2019 |

OTHER PUBLICATIONS

892 Form dated Feb. 15, 2024 which was received in connection with U.S. Appl. No. 17/781,954.

892 Form dated Jun. 13, 2024 which was received in connection with U.S. Appl. No. 17/781,954.

Notice of Allowance dated Jul. 31, 2024 which was received in connection with U.S. Appl. No. 17/781,954.

* cited by examiner

EMERGENCY DRIVER AND INTELLIGENT MODULE FOR THE EMERGENCY DRIVER

RELATED APPLICATIONS

This application is a continuation of U.S. patent application Ser. No. 17/781,954, which was filed on Jun. 2, 2022, which claims benefit of and priority to International Patent Application Serial No. PCT/CN2020/073750 filed on Jan. 22, 2020, the contents of which are hereby incorporated in their entirety for all purposes.

FIELD

Embodiments relate generally to an emergency driver used in a lighting system, and more particularly to an emergency driver adapted for an intelligent module and further an intelligent module for the emergency driver.

BACKGROUND OF THE DESCRIPTION

The background description provided herein is for the purpose of generally presenting the context of the disclosure. Unless otherwise indicated herein, the materials described in this section are not prior art to the claims in this application and are not admitted to be prior art by inclusion in this section.

Nowadays, more and more fixtures are integrated with an emergency driver, which can provide an emergency lighting when there is a mains power outage. In order to ensure the reliability of the emergency power supply, it is required to perform a routine self-test operation on the emergency driver in normal times. A test device is widely used with an emergency driver, having a button switch used in a test device to trigger the self-test operation. LED indicator on the test device can be used to indicate a result of the self-test operation, so that issues tested from the emergency driver, such as a low battery level, a wiring fault or the like, can be caught and fixed before the mains power outage.

There has been a concerted effort to develop intelligent lighting. However, conventional emergency drivers have their self-test operation performed by pressing the button of the test device at the scene. It cannot be triggered remotely. Further, the result of the self-test operation is also unknown to the remote site.

For intelligent lighting, there is a need to upgrade the emergency driver to be suitable for an intelligent system. Instead of attaching to a test device, the emergency driver is required to be connected to a network so that the emergency driver can be triggered remotely to perform the self-test operation and provide the result of the self-test operation to the remote site. There is a further need to achieve an unified management of multiple emergency drivers with less human efforts in order to collect valuable data and save labor cost of inspection tours.

SUMMARY OF THE INVENTION

An aspect of the present disclosure provides an emergency driver. The emergency driver may include a digital communication interface, a DC power supply and a controller. The digital communication interface may be configured to receive an input signal via a control bus. The DC power supply may be configured to provide a DC output to the control bus. The controller may be coupled to the digital communication interface and the DC power supply and may be configured to control the emergency driver to operate in a first operation mode. The input signal received at the digital communication interface may be a digital input signal when the emergency driver is operating in a first operation mode.

Another aspect of the present disclosure provides an intelligent module. The intelligent module may include a wireless communication module, a communication interface and a controller. The wireless communication module may be configured to communicate with a remote device. The communication interface may be configured to be connected with an emergency driver and communicate with the emergency driver in a wire manner. The controller may be configured to control the wireless communication module and the communication interface. The communication interface may be in connection with the emergency driver. The intelligent module may be powered by the emergency driver. The controller may be configured to control the communication interface to transmit to the emergency driver, a first digital control command received by the wireless communication module from the remote device; and control the wireless communication module to transmit to the remote device, digital data received by the communication interface from the emergency driver.

Yet another aspect of the present disclosure provides an emergency driver. The emergency driver may include a digital communication interface, a DC power supply and a controller. The digital communication interface may be configured to receive an input signal via a control bus. The DC power supply may be configured to provide a DC output to the control bus. The controller may be coupled to the communication interface and the DC power supply and may be configured to control the emergency driver to operate in a first operation mode or a second operation mode. In the first operation mode, the input signal received at the communication interface may be a digital signal and the controller may be configured to turn on the DC power supply constantly; control the emergency driver to perform a preset operation based on a digital control command included in the input signal; and control the communication interface to transmit digital data representative of a status of the emergency driver. In the second operation mode, the input signal received at the communication interface may be an analog signal and the controller may be configured to control the emergency driver to perform the preset operation based on a predetermined level characteristic of the input signal; and on/off control the DC power supply in a manner corresponding to the status of the emergency driver.

BRIEF DESCRIPTION OF THE DRAWINGS

So that the manner in which the above recited features of the present embodiments can be understood in detail, a more particular description of the embodiments, briefly summarized above, may be had by reference to embodiments, some of which are illustrated in the appended drawings. It is to be noted, however, that the appended drawings illustrate only typical embodiments and are therefore not to be considered limiting of its scope.

DETAILED DESCRIPTION

Figure 1:
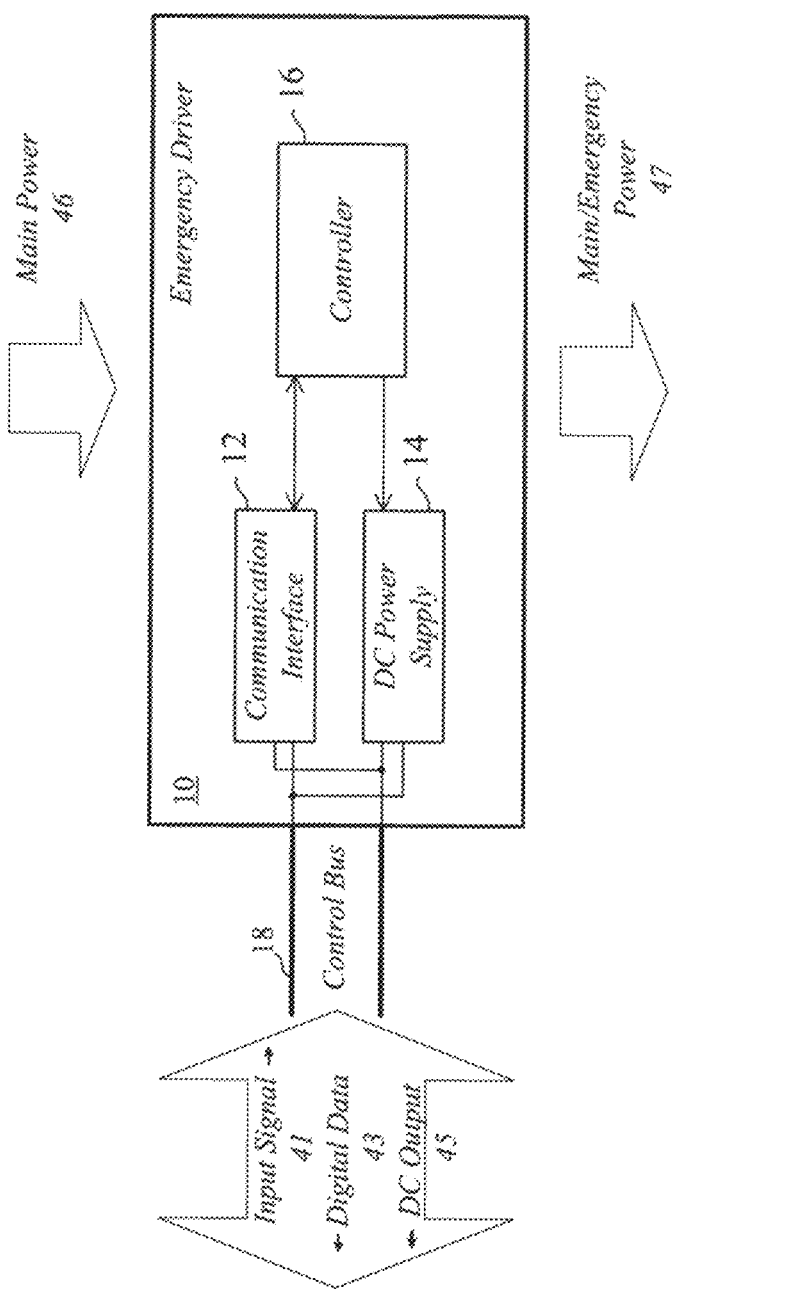
FIG. 1 is a block diagram illustrating an example emergency driver 10 in accordance with embodiments.

In the following description, for the purposes of explanation, numerous specific details are set forth in order to provide a thorough understanding of the embodiments of the disclosure described below. It will be apparent, however, to one skilled in the art that the embodiments of the disclosure may be practiced without some of these specific details. In other instances, well-known structures and devices are shown in block diagram form to avoid obscuring the underlying principles of the embodiments of the disclosure.

It should be noted that the terms "comprises", "comprising", "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description, numerous specific details are set forth. However, it is understood that embodiments of the invention may be practiced without these specific details. In other instances, well-known circuits, structures and techniques have not been shown in detail in order not to obscure the understanding of this description.

As used herein, the term "circuitry" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

As used herein, the term "controller" may refer to for example a digital signal processor (DSP), a microcontroller, an application specific integrated circuit (ASIC), or a microprocessor.

An emergency driver described herein is applicable to a power supply system which may have a main power source configured to drive one or more electric loads. The emergency driver may be provided between the main power source and the one or more electric loads and is configured to provide a backup power supply when the main power source is down. The emergency driver may include a backup power source such as a battery package or the like. In order to ensure the reliability of the emergency driver, for example to ensure that no wiring fault will occur in an emergency lighting, or the remaining capacity of battery level sufficient for providing a backup power supply, or the like, the emergency driver may be configured to perform various preset operations, such as self-test operations or other actions. The self-test operations may be a quick self-test lasting for e.g. a few seconds or even shorter for some basic tests, or an overall self-test lasting for e.g. a few minutes, tens minutes or even a few hours for an overall test, etc. Other actions may include entering a maintenance mode where no backup power supply is output when the main power source is down, setting an interval of extended emergency mode where the backup power supply will be kept for an interval after the main power source is recovered, and entering an identification mode where the electric load will be activated so as to show which electric load is being controlled.

Further, the emergency driver described herein can be used with an intelligent module. In particular, the emergency driver can be connected to an intelligent module via a common control bus. The control bus may have only two connection wires for triggering a preset operation of the emergency driver and communicating a status of the emergency driver. The status of the emergency driver may be obtained by performing the preset operations. In some embodiments, the status of the emergency driver may be a result of a self-test operation. In other embodiments, the status of the emergency driver may be results of other preset operations which are collected and stored in a non-volatile memory of the emergency driver.

In the case of connecting to an intelligent module, the emergency driver may be connected to a remote device wirelessly via the intelligent module. With the intelligent module, a preset operation of the emergency driver can be triggered from the remote device remotely and the status of the emergency driver obtained by performing the triggered preset operation or other preset operations may be transmitted to the remote device.

FIG. 1 is a block diagram illustrating an example emergency driver 10 in accordance with embodiments. As shown in FIG. 1, the emergency driver 10 includes a digital communication interface 12, a DC power supply 14 and a controller 16. The emergency driver 10 may also include a circuitry of performing a self-test operation and a backup power source such as a battery package or the like, which are not shown for the ease of illustration. The backup power source is used to provide emergency power supply, i.e. emergency power 47, to a load such as one or more fixtures.

The digital communication interface 12 is coupled to a control bus 18 to receive an input signal 41 and transmit an output signal via the control bus 18. The digital communication interface 12 is further coupled to the controller 16 to transfer the input signal 41 from the control bus 18 to the controller 16 and the output signal from the controller 16 to the control bus 18. The output signal may include digital data 43 from the controller 16 or a DC output 45 from the DC power supply 14.

As an example, the digital communication interface 12 may be DALI (Digital Addressable Lighting Interface). It is an International Standard (IEC 62386) lighting control system, providing a single interface for all electronic control gear (light sources) and electronic control devices (lighting controllers). With use of DALI, the emergency driver 10 may be applied to a lighting system in a more effective way.

The DC power supply 14 is also coupled to the control bus 18 to provide the DC output 45 to the control bus 18 and is powered by the DC power supply 14 of the emergency driver 10. The DC power supply 14 may be drawn from the main power source. The DC output 45 of the DC power supply 14 is controlled by the controller 16.

For example, the controller 16 may be configured to turn on the DC power supply 14 constantly to provide a constant power supply. This turning on may be implemented when the emergency driver 10 is connected to an intelligent module described below. Alternatively, the controller 16 may be configured to on/off control the DC power supply 14 to provide a particular sequence of low levels and high levels in the output of the DC power supply 14. This on/off controlling may be implemented when the emergency driver 10 is connected to a test device with an indicator such as an LED indicator, an audio beeper instead of the intelligent module. In this case, the indicator may flash or beeps in accordance with the particular sequence of the low and high levels in the DC output 45 of the DC power supply 14 to present the status of the emergency driver. In some embodiments, the controller 16 may be configured to control the DC output 45 of the DC power supply 14 based on a default resident in the controller 16. In some other embodiments, the controller 16 may be configured to control the DC output 45 of the DC power supply 14 based on the input signal 41 received by the digital communication interface 12 via the control bus 18. Details of the connection with the intelligent module and the test device will be illustrated in further detail below.

In at least one embodiment, the control bus 18 may include two connection wires. The digital communication interface 12 and the DC power supply 14 may share the two connection wires of the control bus 18. Thus, the number of the connection wires of the control bus 18 can be minimized. It should be appreciated that the control bus 18 may also include more than two connection wires, and the digital communication interface 12 and the DC power supply 14 may coupled to the control bus 18 with different connection wires or by sharing some of the connection wires.

Figure 2:
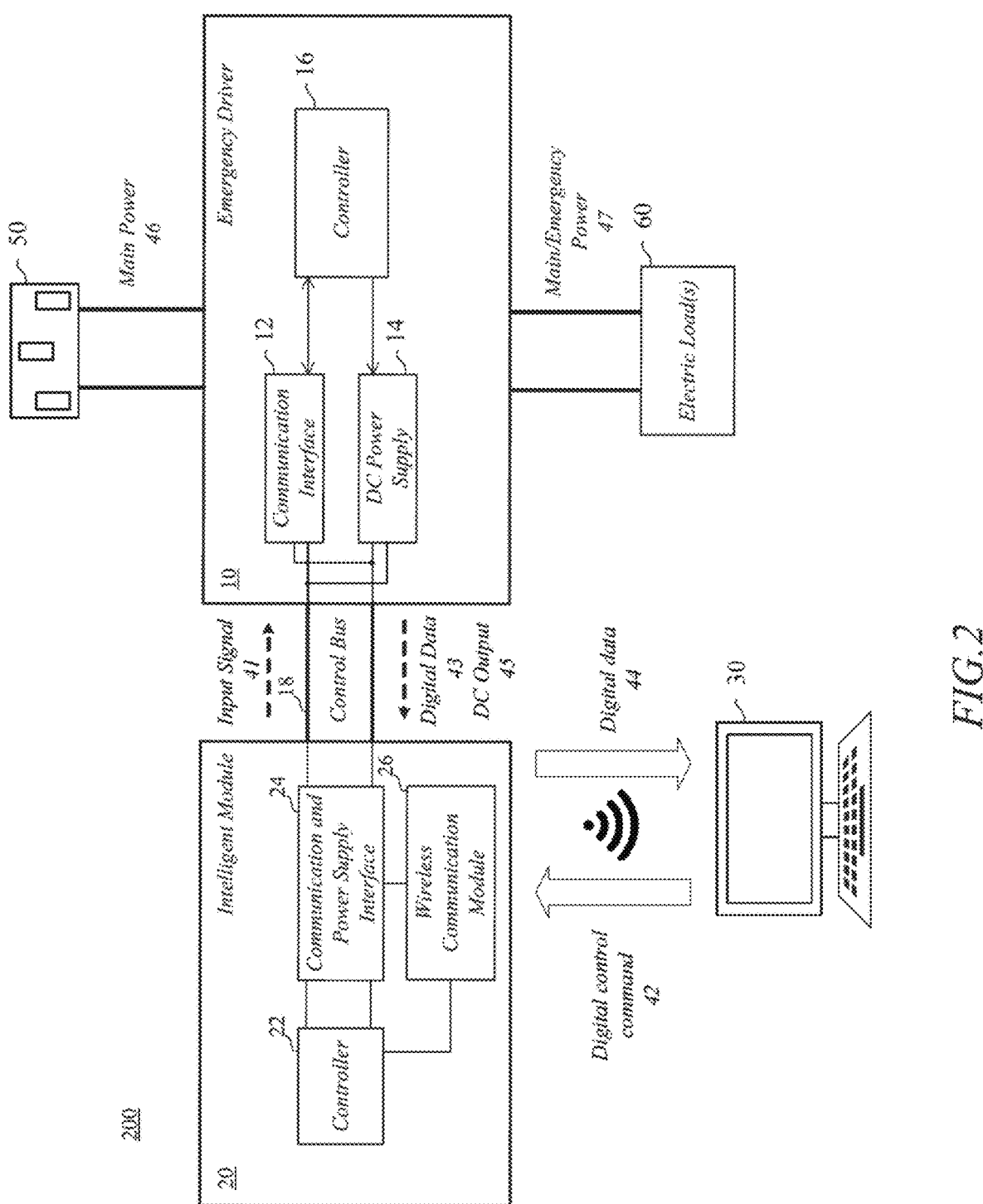
FIG. 2 illustrates an example lighting system 200 in which the emergency driver 10 of FIG. 1 is in connection with an intelligent module 20 in accordance with embodiments.

FIG. 2 illustrates an example lighting system 200 in which the emergency driver 10 of FIG. 1 is in connection with an intelligent module 20 in accordance with embodiments.

In some embodiments, the emergency driver 10 is connected between a main power supply 50 and an electric load(s) 60. In general, the main power supply 50 is configured to provide electric main power 46 to the electric load(s) 60. The emergency driver 10 is configured to provide an emergency power 47 to the electric load(s) 60 by using a backup power supply (not shown) when the main power supply 50 is down. In some embodiments, the emergency driver 10 may be used to power only some essential components of the system 200, for example the electric load(s) 60, instead of the whole system.

In some embodiments, the emergency driver 10 is connected with an intelligent module 20 via the control bus 18. The intelligent module 20 may include a controller 22, a communication and power supply interface 24 and a wireless communication module 26.

The wireless communication module 26 is configured to communicate with a remote device 30 via a wireless network. The wireless communication module 26 may be configured to receive a digital control command 42 from the remote device 30 and transmit digital data 44 to the remote device 30. The inputs and outputs of the intelligent module 20 are digital signals.

The wireless communication module 26 may use any number of frequencies and protocols, such as 2.4 gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the remote device 30. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, can occur via a WWAN unit.

The remote device 30 may be servers, mobile phones (e.g. cellular phones), PDAs, tablet computers, net books, laptop computers, etc. The remote device 30 may also be cloud or the like.

The digital control command 42 received from the remote device 30 may be a command (also referred as "a first digital control command") used to trigger a preset operation of the emergency driver 10, a command (also referred as "a second digital control command") used to switch the operation mode of the emergency driver 10, and a command (also referred as "a third digital control command") used to modify a preset condition stored in a memory of the controller 16 of the emergency driver 10, and a command used to modify a preset mode switch pattern stored in the memory. The preset condition may be representative of an identified level characteristic of the input signal 41 that will trigger a preset operation of the emergency driver 10. The preset mode switch pattern may be representative of a specific combination of low and high level(s) of the input signal 41 that will trigger a switch of the operation mode of the emergency driver 10, etc. Details will be illustrated in further detail below.

The digital data 44 transmitted to the remote device 30 may include data representative of a status of the emergency driver 10. For example, the status of the emergency driver 10 may indicate that the emergency driver 10 is in good situation to provide an emergency power supply, a wiring fault occurs in the emergency driver 10, or the remaining capacity of the backup power source of the emergency driver 10 is insufficient to support an emergency lighting, etc.

The communication and power supply interface 24 is coupled to the controller 22, and coupled to the emergency driver 10 via the control bus 18. In an operation mode (also referred as "a first operation mode") where the emergency driver 10 is in connection with the intelligent module 20, the controller 22 may be configured to control the communication and power supply interface 24 to transmit the digital control command 42 received from the remote device 30 to the digital communication interface 12 of the emergency driver 10 and receive digital data 43 from the digital communication interface 12 via the control bus 18. In addition, the communication and power supply interface 24 is also configured to receive DC output 45 from the DC power supply 14 of the emergency driver 10. As a result, the intelligent module 20 is powered by the emergency driver 10. Note that the DC power supply 14 is always providing power to the intelligent module 20 when the emergency driver 10 is operating in the first operation mode because the controller 22, the communication and power supply interface 24 and the wireless communication module 26 of the intelligent module 20 need to be powered constantly.

The controller 16 of the emergency driver 10 may be configured to determine whether the digital control command 42 included in the input signal 41 from the intelligent module 20 instructs to perform a preset operation. The preset operation may be performed by a specific circuitry in the emergency driver 10 under the control of the controller 16. The preset operation may be a quick self-test lasting for e.g. a few seconds or even shorter for some basic tests, and may also be an overall self-test lasting for e.g. a few minutes, tens of minutes or even a few hours for an overall test, etc. The overall self-test may be a discharge detection for e.g. about 90 minutes. The type of the preset operation to be performed is specified by the digital control command 42.

The controller 16 of the emergency driver 10 may be configured to control the digital communication interface 12 to transmit digital data 43 representing a status of the emergency driver 10 to the intelligent module 20 after the self-test operation is completed. The status of the emergency driver 10 may be obtained by performing the corresponding preset operation, and may also be deduced from other data collected and stored in a non-volatile memory (not shown) in the emergency driver 10 previously. The non-volatile memory may be included in the controller 16 or be separated from the controller 16.

In some embodiments, the controller 22 of the intelligent module 20 may periodically control the communication and power supply interface 24 to transmit a digital control command as the input signal 41 to the emergency driver 10 so as to query data representative of the status of the emergency driver 10 even if being offline from the wireless network.

In some embodiments, the controller 16 of the emergency driver 10 may further be configured to determine whether a duration of a low level in the input signal 41 from the intelligent module 20 exceeds a preset threshold (also referred as "a first preset threshold"). Since the incoming signal from the intelligent module 20 is a digital signal, the duration of its low level should be short as for example a few hundreds of microseconds or even shorter and no longer than 2 milliseconds. If the duration exceeds a preset threshold, for example of 1 second, the controller 16 may then determine that a short circuit occurs in the intelligent module 20, and thus may limit the current output from the DC power supply 14 for security. The controller 16 may further configured to control the digital communication interface 12 to transmit data indicative of this fault to the intelligent module 20. The intelligent module 20 may then transmit the fault data to the remote device 30 via the wireless communication module 26. The remote device 30 may feedback a digital control command 42 to the intelligent module 20 in response to the receipt of the fault information. For example, the controller 22 may control the communication and power supply interface 24 to, for example, block the input from the emergency driver 10 or generate an alarm in accordance with the digital control command 42.

According to some embodiments, the emergency driver 10 can be applied in an intelligent system, such as system 200, by connecting with the intelligent module 20. The emergency driver 10 is linked to the remote device 30 via the intelligent module 20. Thus, a preset operation of the emergency driver 10 can be triggered by an instruction from the remote device 30 and data representative of a status of the emergency driver 10 can be transmitted to the remote device 30.

The emergency driver 10 described herein may also be suitable for a test device, which may include an indicator such as LED indicator, and a button. When the current operation mode of the emergency driver 10 suitable for the test device the intelligent module 20 is switched to a different operation mode suitable for the test device (also referred as "a second operation mode"), the preset operation of the emergency driver 10 can be triggered by pressing the button and the status of the emergency driver 10 can be presented using the indicator. The indicator may also include a buzzer, a speaker or others that may be driven by on/off control, not limitative to a LED indicator. The change of operation modes will be illustrated in further detail below.

Figure 3:
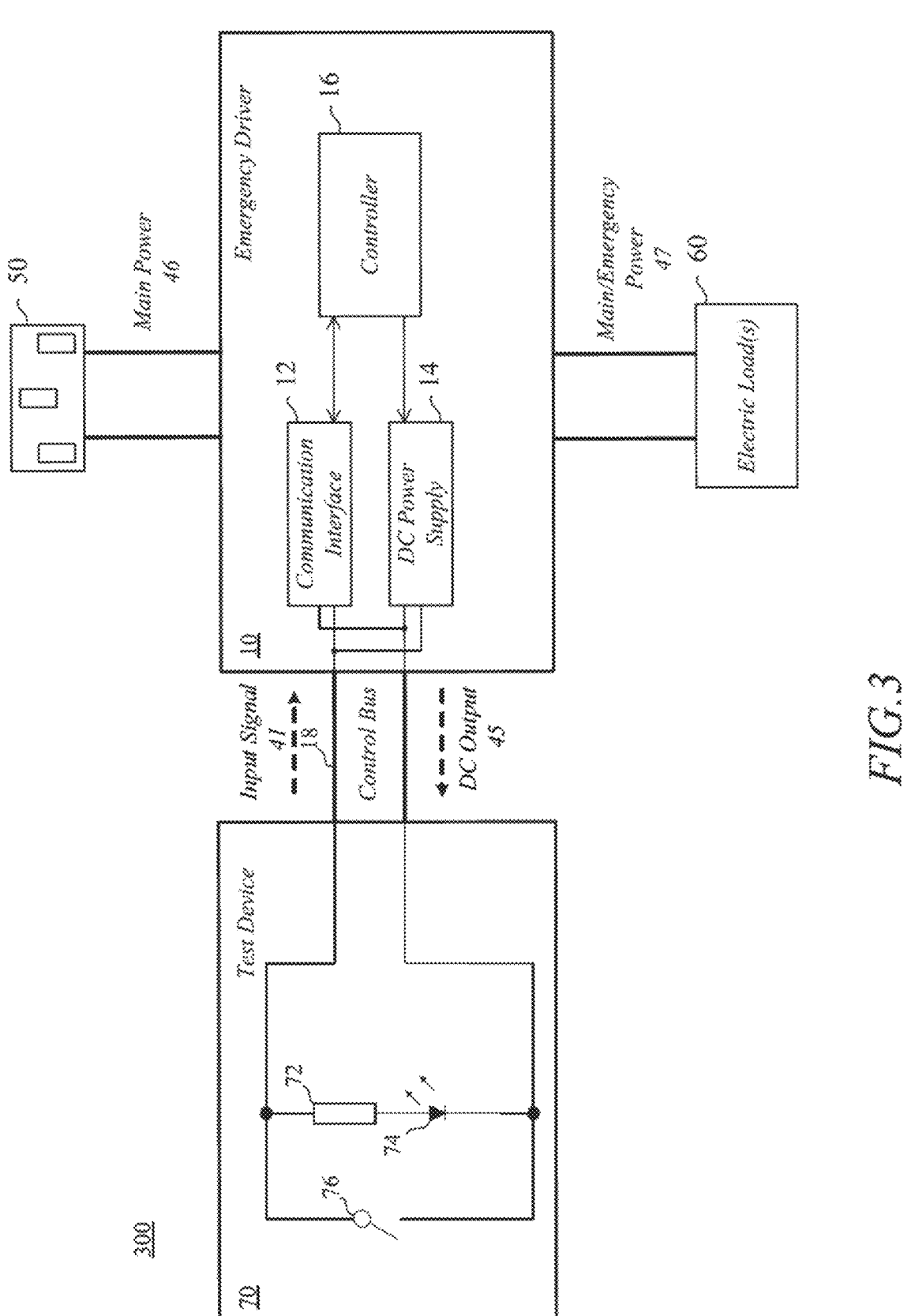
FIG. 3 illustrates an example lighting system 300 in which the emergency driver 10 of FIG. 1 is in connection with a test device 70 in accordance with embodiments.

FIG. 3 illustrates an example lighting system 300 in which the emergency driver 10 of FIG. 1 is in connection with a test device 70 in accordance with embodiments. The test device 70 may include for example a LED indicator 74 and a button 76. The test device 70 may further include a resistor 72 for current limiting. The test device 70 is connected to the emergency driver 10 via the control bus 18 such that the LED indicator 74 can be powered by the DC power supply 14 of the emergency driver 10. The signal 41 output from the test device 70 is an analog signal determined by a press operation on the button 76.

As shown in FIG. 3, the LED indicator 74 is connected in series with the resistor 72 and in paralleled with the button 76. When the button 76 is not pressed, on/off of the LED indicator 74 is determined by a DC voltage (DC output 45) on the control bus 18. For example, the controller 16 may be configured to on/off control the DC power supply 16 and accordingly on/off control the LED indicator 74. The controller 16 may control the LED indicator 74 to flash in a defined flashing pattern to indicate the status of the emergency driver 10. When the button is pressed, the control bus 18 is short-circuited such that the LED indicator 74 is turned off, A low level may be detected in the input signal 41 from the test device 70 by the controller 16. The controller 16 may control the emergency driver 10 to perform a preset operation corresponding to the low level, for example a self-test operation such as a quick self-test and an overall self-test, or other actions.

By way of example, and not limitation, after the button 76 is released and for example a self-test operation is completed, the controller 16 may be configured to on/off control the DC power supply 14 such that the LED indicator 74 is turned on for a few seconds to indicate that the emergency driver 10 is in a normal status. Alternatively, the controller 16 may on/off control the DC power supply 14 such that the LED indicator 74 flashes in a lower frequency or flashes for example twice to indicate that the remaining capacity of the backup power source of emergency driver 10 is insufficient. Further, the controller 16 may also on/off control the DC power supply 14 such that the LED indicator 74 flashes in a higher frequency or flashes for example three or more times to indicate wiring faults in the emergency driver 10. Various flashing patterns can be designed as needed but are not limitative.

To trigger a preset operation, the controller 16 may be configured to determine if a level characteristic of the input signal 41 received from the test device 70 via the digital communication interface 12 satisfies a predetermined condition. For example, the controller 16 may simply detect a low level in the input signal 41 which indicates that the button 76 is pressed. Once a low level is detected in the input signal 41, the controller may trigger the present operation such as a self-test operation. In some embodiments, the level characteristic of the input signal 41 may be a duration of the low level. For example, the controller 16 may be configured to control the emergency driver 10 to perform a quick self-test when a duration of the low level is in a range of about 1 to 5 seconds, and to perform an overall self-test when a duration of the low level is more than 5 seconds. Alternatively, the level characteristic of the input signal 41 may be a specific frequency of the low level in the input signal 41, or a specific pattern of low and high levels in the input signal 41, or the like.

Such level characteristics, thresholds (1 second and/or 5 seconds) and conditions for triggering various preset operations may be stored in the non-volatile memory of the controller 16.

In the case of being compatible for both the intelligent module 20 and the test device 70, the emergency driver 10 needs to be changeable between the respective operation modes as the input and output signals from and to the intelligent module 20 and the test device 70 are different. In particular, the signal from the intelligent module 20 is a digital signal and the signal from the test device 70 is an analog signal.

Operation mode switching of the emergency driver 10 may be determined by its controller 16 based on the input signal 41. The input signal 41 may be those from the intelligent module 20 or the test device 70, or from a specific device. In some embodiments, the emergency driver 10 may itself have a trigger for operation mode switching. Settings for different operation modes may be stored in the controller 16, for example in a non-volatile memory of the controller 16. However, a separate memory may also be used.

In the case where a user intends to replace an intelligent module 20 with a test device 70 so as to have the test device 70 connected with the emergency driver 10, the user may operates the intelligent module 20 to cause the communication and power supply interface 24 to transmit a digital control command, instructing the emergency driver 10 to switch its operation mode for the test device 70 before disconnecting the intelligent module 20 with the emergency driver 10. The digital control command may be generated by the controller 22 of the intelligent module 20. If the intelligent module 20 is linked to a remote device 30 via a network, the user may operate the intelligent module 20 remotely. In this case, the digital control command may be generated by the remote device 30.

In the case where a user intends to replace a test device 70 with an intelligent module 20 so as to have the intelligent module 20 connected with the emergency driver 10, the user may press the button 76 of the test device 70 in a predetermined manner. For example, the user may short press the button 76 three times quickly. The controller 16 of the emergency driver 10 may be configured to identify such a pattern in the levels of the input signal 41 and then switch the operation mode of the emergency driver 10 to the one for the intelligent module 20.

According to the embodiments, the emergency driver 10 is compatible for both the intelligent module and the test device. Further, connection with the intelligent module or the test device can be achieved with only two connection wires of the control bus 18. No additional wiring may be needed. The emergency driver 10 can be directly upgraded into an intelligent system by replacing the test switch 70 with the intelligent module 20 without additional wirings.

Figure 4:
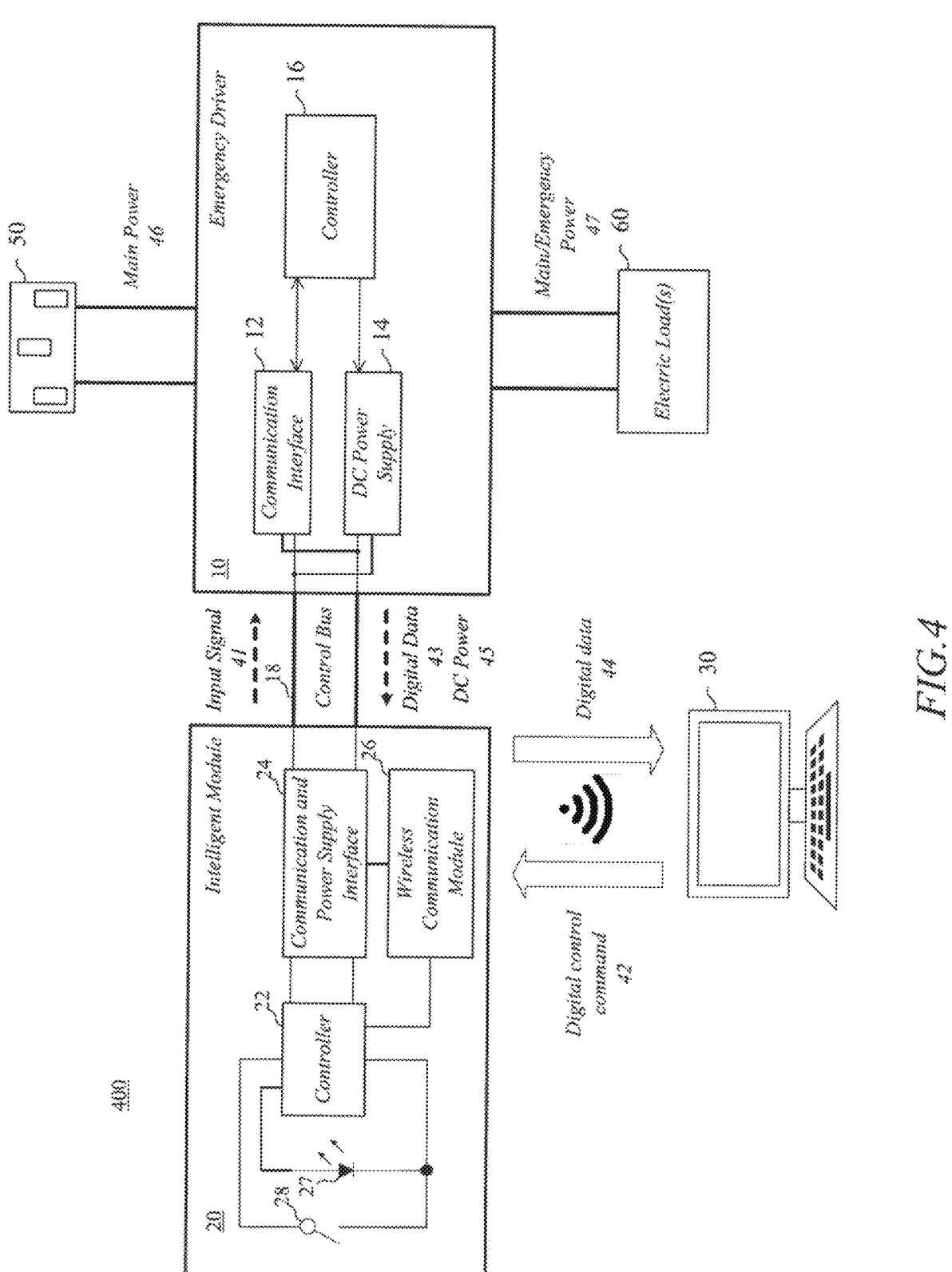
FIG. 4 illustrates an example lighting system 400 wherein the intelligent module 20 includes a LED indicator 27 and a button 28 in accordance with embodiments.

FIG. 4 illustrates an example lighting system 400 in which the intelligent module 20 includes an indicator 27 and a button 28 in accordance with embodiments. The indicator 27 such as a LED indicator, and the button 28 may be similar to the LED indicator 74 and the button 76 as shown in FIG. 3, except for the connections thereof.

Both the LED indicator 27 and the button 28 are connected to the controller 22 and the LED indicator 27 is controlled by the controller 22. The controller 22 may be configured to identify a specific pattern of high and low levels in the current caused by pressing the button 28 in a sequence and instruct the communication and power supply interface 24 to transmit a digital control command based on the identified pattern so as to trigger a preset operation of the emergency driver 10. Further, upon receiving digital data 43 representative of the status of the emergency driver 10 from the emergency driver 10, the controller 22 may control the LED indicator 27 to flash in a manner corresponding to the status of the emergency driver 10. Thus, the intelligent module 20 may be configured to further have the functions of a traditional test device to trigger a preset operation of the emergency driver 10 and present the status of the emergency driver 10 with no need of replacing the intelligent module 20 with a test device when the wireless communication module or the network is able to be disconnected with the remote device 30. Such an arrangement enables the intelligent module 20 to work locally. In some embodiments, the intelligent module 20 may not have a button 28. In this case, a preset operation of the emergency driver 10 may be triggered by the remote device 30 as described above, and the LED indicator 27 may be used to flash in a manner corresponding to the status of the emergency driver 10 so as to present the status of the emergency driver 10.

Figure 5:
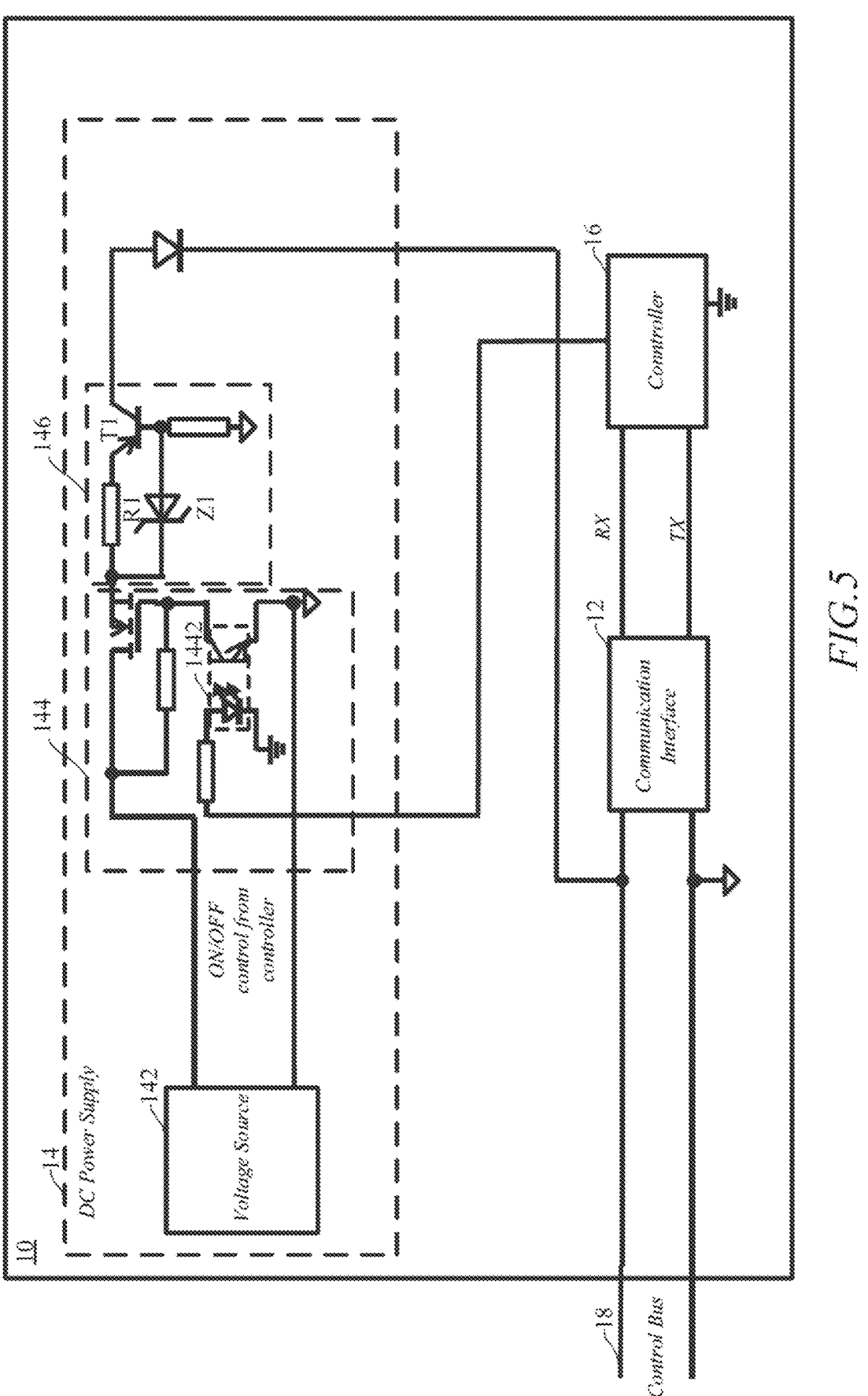
FIG. 5 illustrates an example circuit configuration of the emergency driver 10 in accordance with embodiments.

FIG. 5 illustrates an example circuit configuration of an emergency driver 10 in accordance with embodiments. As shown in FIG. 5, the DC power supply 14 may include a voltage source 142, a switch circuit 144 and a current limit circuit 146.

The voltage source 142 may be obtained from a backup power source of the emergency driver 10, such as a battery package. The switch circuit 144 is on/off controlled by the controller 16 so as to on/off control the output of the voltage source 142. It may include an optocoupler 1442 to separate the controller 16 from the voltage source 142.

The current limit circuit 146 is coupled to an output of the voltage source 142 and may include a zener diode Z1, a resistor R1 and a transistor T1 to implement a negative feedback control. When a current drawn from the control bus 18 increases, the voltage drop on the resistor R1 increases. Due to a constant voltage on Zener diode Z1, the voltage drop on emitter-base of the transistor T1 is decreased. When the current drawn from the control bus 18 is larger than a threshold, the voltage drop on the emitter-base of the transistor T1 is too small to maintain the current. Thus, the current output to the control bus 18 is limited.

The controller 16 may be coupled to the digital communication interface 12 via two wires, i.e. RX and TX. When the emergency driver 10 is operating in the first operation mode for the intelligent module 10, the output of the voltage source is always provided to the intelligent module 20. The controller 16 may be configured to receive a digital control command from the intelligent module 20 via the wire RX and transmit digital data to the intelligent module 20 via the wire TX. When the emergency driver 10 is operating in the second operation mode for the test device 70, the controller 16 may detect a press pattern of the button 76 via the wire RX only.

It is understood that the outputs of the control bus 18 have polarities, i.e. positive and negative. Therefore, the test device 70 needs to be connected to the emergency driver 10 in correct polarities. However, such a requirement can be eliminated by adding a rectifying circuit in the intelligent module 20. Then, it is possible to connect the intelligent module 20 with the emergency driver 10 regardless of the polarities.

Figure 6:
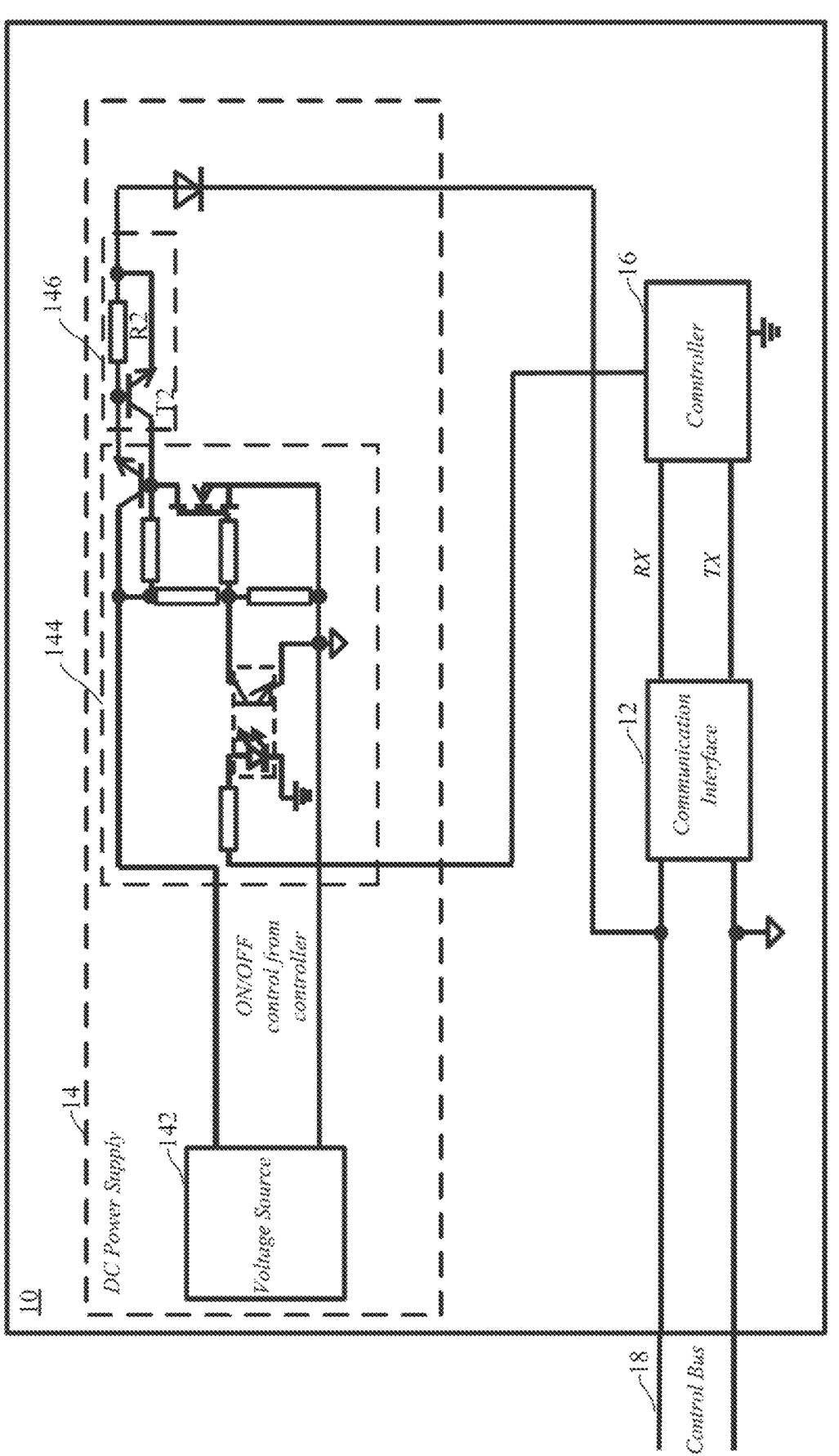
FIG. 6 illustrates another example circuit configuration of the emergency driver 10 in accordance with embodiments.

FIG. 6 illustrates another example circuit configuration of an emergency driver 10 in accordance with embodiments. Similar to the emergency driver 10 shown in FIG. 5, the DC power supply 14 may include a voltage source 142, a switch circuit 144 and a current limit circuit 146.

FIG. 6 shows another example circuit configuration of the switch circuit 144 and the current limit circuit 146. In particular, the current limit circuit 146 may include a transistor T2 and a resistor R2 to implement a negative feedback control. When a current drawn from the control bus 18 increases, a voltage drop on the resistor R2 increases. When the voltage drop on the resistor R2 is larger than a threshold, the resistance of the transistor T2 is decreased and a voltage drop on base-emitter of the transistor T2 is decreased. Therefore, the resistance of transistor T2 increases. Thus, the current output to the control bus 18 is limited.

Reference throughout this specification to exemplary embodiments and similar language throughout this specification may, but do not necessarily, refer to the same embodiment. Furthermore, the described features, structures, or characteristics of the subject matter described herein with reference to an exemplary embodiment may be combined in any suitable manner in one or more exemplary embodiments.

It will be apparent to those skilled in the art that various modifications and variations can be made in the present disclosure without departing from the spirit or scope of the disclosure. Thus, it is intended that the appended claims cover the modifications and variations of this disclosure provided they come within the scope of the appended claims and their equivalents.

What is claimed is:

1. A method for operating an emergency driver, comprising:

receiving, over a digital communication interface of an emergency driver, an input signal, wherein the emergency driver is electrically connected between a main power supply and at least one electric load and is configured to provide a backup power supply to the at least one electric load when the main power supply is down;

determining whether the input signal is one of (i) a digital signal and (ii) an analog signal;

in the event the input signal is the digital signal, operating a controller to control the emergency driver to operate in a first operation mode, wherein the first operation mode includes operating a DC power supply of the emergency driver to provide a DC power signal to provide power to a control bus and to the digital communication interface of the emergency driver;

in the event the input signal is the analog signal, operating the controller to control the emergency driver to operate in a second operation mode, wherein the second operation mode includes determining a level of the analog signal; and based on the determined level of the analog signal, performing a preset operation.

2. The method of claim 1, further comprising:

transmitting, over the digital communication interface, digital data representative of a status of the emergency driver, and wherein the first operation mode further includes

12 operating the DC power supply constantly;

controlling the emergency driver to perform a preset operation based on a first digital control command included in the digital input signal; and controlling the digital communication interface to transmit the digital data.

3. The method of claim 2, wherein the first operation mode includes limiting the DC power supply in response to determining that a duration of a low level of the digital input signal exceeds a first preset threshold.

4. The method of claim 2, wherein the analog signal is generated by interaction with an external button of a test device connected to the emergency driver.

5. The method of claim 4, wherein processing in the second operation mode further comprises:

controlling the emergency driver to perform the preset operation based on the determined level of the analog signal; and controlling an on/off condition of the DC power supply in a manner corresponding to a status of the emergency driver.

6. The method of claim 5, wherein processing in the second operation mode further comprises controlling the emergency driver to perform the preset operation in response to determining that the determined level of the analog signal satisfies a preset condition.

7. The method of claim 5, wherein processing in the second operation mode further comprises controlling the on/off condition of the DC power supply corresponding to the status of the emergency driver when the determined level of the analog signal is a high level.

8. The method of claim 2, wherein the status of the emergency driver is obtained by performing at least one of (i) the preset operation, and (ii) determining the status based on data previously collected and stored in a memory in the emergency driver.

9. The method of claim 6, wherein the preset condition is that a duration of a low level of analog signal exceeds a second preset threshold.

10. The method of claim 6, wherein the preset condition of the second operation mode is set by receiving a third digital control command included in the input signal when the emergency driver is operating in the first operation mode.

11. The method of claim 5, further comprising:

controlling the emergency driver to switch between the first operation mode and the second operation mode based on a second digital control command included in the digital signal.

12. The method of claim 5, further comprising:

controlling the emergency driver to switch between the first operation mode and the second operation mode in response to a determination that an input pattern identified from the analog signal is a preset mode switch pattern.

13. The method of claim 5, further comprising:

controlling the emergency driver to switch between the first operation mode and the second operation mode based on a default mode stored in the controller.

14. The method of claim 1, wherein the control bus includes two connection wires, and wherein the digital communication interface and the DC power supply are coupled to said two connection wires commonly.

15. The method of claim 14, wherein the controller is coupled to the digital communication interface via a first wire and a second wire, and in the first operation mode, the controller receives the input signal via the first wire and transmits an output signal via the second wire, and in the second operation mode, the controller receives the input signal via the first wire.

16. The method of claim 1, wherein the digital communication interface is a Digital Addressable Lighting Interface ("DALI").

17. A method for operating an intelligent module, the intelligent module including a wireless communication module to communicate with a remote device, a communication interface in communication with an emergency driver and a controller configured to control the wireless communication module and the communication interface, the method comprising:

determining a connection with the emergency driver;

receiving power from the emergency driver;

operating the controller to control the communication interface to transmit to the emergency driver, a first digital control command received by the wireless communication module from the remote device;

controlling the wireless communication module to transmit to the remote device, digital data received by the communication interface from the emergency driver including data representing a status of the emergency driver; and controlling the at least one indicator to operate in a manner corresponding to the status of the emergency driver.

18. The method of claim 17, wherein the intelligent module further comprises a button electrically connected to the controller, and wherein the method further comprises:

operating the controller to identify an input pattern from a change in a current of the intelligent module caused by pressing the button;

operating the controller to generate a second digital control command based on the identified input pattern; and controlling the communication interface to transmit the generated second digital control command to the emergency driver such that the emergency driver is controlled to perform a preset operation corresponding to the identified input pattern.

19. The method of claim 17, further comprising:

operating the controller to query a memory of the emergency driver to obtain the status of the emergency driver.

20. A method, comprising:

receiving, over a digital communication interface of an emergency driver, an input signal, wherein the emergency driver is electrically connected between a main power supply and at least one electric load and is configured to provide a backup power supply to the at least one electric load when the main power supply is down;

determining whether the input signal is one of (i) a digital signal and (ii) an analog signal;

in the event the input signal is the digital signal, operating a controller to control the emergency driver to operate in a first operation mode, wherein the first operation mode includes operating a DC power supply of the emergency driver to provide a DC power signal to provide power to a control bus and to the digital communication interface of the emergency driver;

in the event the input signal is the analog signal, operating the controller to control the emergency driver to operate in a second operation mode, wherein the second operation mode includes determining a level of the analog signal, wherein the level is at least one of a high level and a low level;

in the event the determined level is a low level, limiting the DC power supply in response to determining that a duration of a low level of the digital signal exceeds a first preset threshold; and in the event the determined level is a high level, controlling the on/off condition of the DC power supply corresponding to a status of the emergency driver.

* * * * *